United States Patent
Segers

(10) Patent No.: US 6,357,456 B2
(45) Date of Patent: Mar. 19, 2002

(54) PROCESS FOR CLEANING AND DRYING CHERRY PITS

(76) Inventor: Frans Segers, Sands Condominiums, No. 39, N. Bayshore Dr., Elk Rapids, MI (US) 49629

(*) Notice: Subject to any disclaimer, the term of this patent is extended or adjusted under 35 U.S.C. 154(b) by 0 days.

(21) Appl. No.: 09/915,870

(22) Filed: Jul. 26, 2001

Related U.S. Application Data

(62) Division of application No. 09/396,581, filed on Sep. 15, 1999, now Pat. No. 6,289,543
(60) Provisional application No. 60/144,300, filed on Jul. 16, 1999.

(51) Int. Cl.[7] ............................................... A23N 12/06
(52) U.S. Cl. ........................... 134/25.3; 134/6; 134/32; 15/3.11; 15/3.13
(58) Field of Search .......................... 134/61, 25.3, 32; 15/3.11, 3.1, 3.12, 3.13

(56) References Cited

U.S. PATENT DOCUMENTS

| | | | | |
|---|---|---|---|---|
| 1,561,043 A | * | 11/1925 | Zuckerman | ................... 15/3.11 |
| 4,901,861 A | * | 2/1990 | Cicchelli | ..................... 209/539 |
| 5,329,843 A | * | 7/1994 | Cheung | ........................ 99/549 |
| 5,962,095 A | * | 10/1999 | Beck | .......................... 428/35.6 |

* cited by examiner

*Primary Examiner*—Zeinab El-Arini

(57) ABSTRACT

A processing system for cleaning, washing, drying, and sorting cherry pits. Once the pits are removed from the cherries, they are washed, scrubbed, and cleaned. Any excess water is removed from them and the pits are then thoroughly dried. Any partial or broken pits are removed, as well as any metal impurities. The cleaned and dried whole cherry pits can then be inserted into bags or containers and included in a therapeutic product, such as a cushion, U-shaped neck device, or a huggable stuffed animal character.

7 Claims, 3 Drawing Sheets

PROCESS FOR CLEANING AND DRYING CHERRY PITS

CROSS-REFERENCE TO RELATED APPLICATIONS

This is a divisional of U.S. patent application Ser. No. 09/396,581 filed on Sep. 15, 1999, now U.S. Pat. No. 6,289,543.

Moreover, priority of the subject matter of the present application is based on pending U.S. Provisional Application Ser. No. 60/144,300, filed on Jul. 16, 1999, the disclosure of which is also hereby incorporated by reference therein.

TECHNICAL FIELD

The present invention relates to systems and processes for preparing cherry pits for further use in consumer and therapeutic products and the like.

BACKGROUND OF THE INVENTION

There are numerous products known today which, when heated or cooled, can be used for therapeutic purposes. These products include various pads, cushions, and compresses, typically filled with a synthetic material. Some of these products can be heated in an oven or microwave, while others can be cooled in a refrigerator or freezer, in order to provide various therapeutic benefits.

Therapeutic products which use natural ingredients, or which can be used in either a heated or cooled manner, are not well-known and often are very expensive. Also, these products generally do not retain their temperature (whether hot or cold) for a sufficient length of time.

Thus, there is a need for therapeutic-type products which use more natural ingredients, such as cherry pits, which are biodegradable. There also is a need for therapeutic-type products which can be either heated or cooled, as desired, in order to provide the appropriate benefit, and which can retain their temperatures for a longer period of time.

When cherry pits or other natural ingredients are used for such products, there is a need for an improved and beneficial process and processing system for cleaning, washing, drying, and sorting the pits. There also is a need for environmental friendly processing systems which do not use or generate byproducts or waste products which may be harmful to the environment.

SUMMARY OF THE INVENTION

The present invention provides a unique and beneficial system and process for preparation and use of cherry pits in consumer products, particularly for therapeutic use. The processed cherry pits are enclosed in a bag or container and positioned in a final product in order to provide a therapeutic-type product. The unique processing system cleans, washes, dries, and sorts the cherry pits in an optimum and efficient manner in order to allow them to be utilized in the products. With the present process, the cherry pits are processed without the formation of environmental harmful waste or byproducts.

In accordance with the process, the cherry pits are first removed from the cherry fruit with traditional pitting mechanisms. The pits are then washed and dried in a hydrosieve or centrifuge mechanism. Excess pulp and fruit from the pits is removed by a brush and abrader mechanism, and the scrubbed pits are discharged to a dryer. The drying mechanism retains the pits for a certain length of time and at certain temperatures in order to remove the requisite amount of moisture.

Once the pits are dried, they are sent to a shaking/vibrating apparatus in order to separate the whole pits from the half and partial pits. The cleaned, whole, dried pits are then discharged from the shaking/vibrating mechanism and preferably passed through a metal detector to remove any unwanted and undesirable metal particles that may be included with the pits.

Once the cherry pits are dried and separated, they can be stored in large containers for later usage or utilized directly in the therapeutic products. For use in the products, the cherry pits are positioned in mesh-type bags or containers. Preferably, the mesh-type material is a flame retardant polyester knit material. The bags can be of different sizes depending on the use of the cherry pits and the product in which the bag of cherry pits is to be positioned. Further, the bag or container also can have a mildew-resistant coating on it in order to prevent the formation of mildew and associated odors.

The bags or containers of cherry pits are then inserted inside a product, such as a cushion. In this regard, the product can be an animal character, such as a stuffed-type animal, a pillow or cushion, or a shaped product allowing therapeutic use thereof on an appropriate portion of a person's body, such as a U-shaped device for the neck. The product also can have a zippered opening in order to allow the bag or container of cherry pits to be removed when desired.

The cushion or outer product can be made of a woven or non-woven fabric, and be either natural or synthetic. The material also preferably has a flame-retardant coating, as well as a waterproof and anti-yeast protection on it.

These and other features, attributes, and benefits of the invention will become apparent from the following description of the invention, when viewed in accordance with the accompanying drawings and appended claims.

PREFERRED EMBODIMENT(S) OF THE INVENTION

As indicated above, the present invention provides a unique and beneficial method and system for processing cherry pits, as well as unique and beneficial products in which the processed cherry pits are utilized. In general, the processing system includes the cleaning and drying of the cherry pits, while the subsequent use of the cherry pits includes positioning them in bags or other containers and then inserting the bags or containers into other products of particular shapes for particular therapeutic uses.

Figure 1:
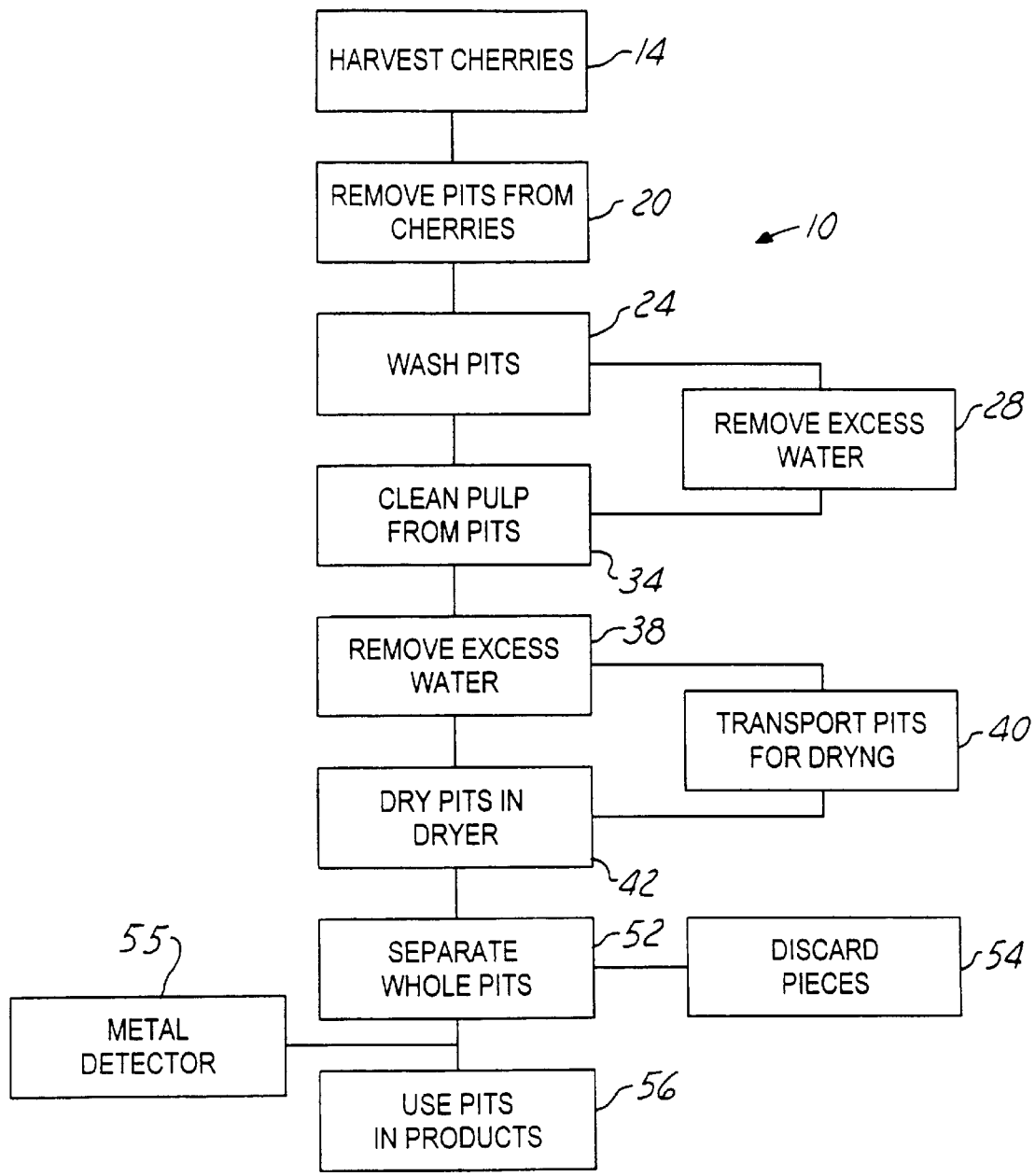
FIG. 1 is a schematic diagram of a flow chart illustrating the principal steps of the cherry pit processing system.
Figure 2:
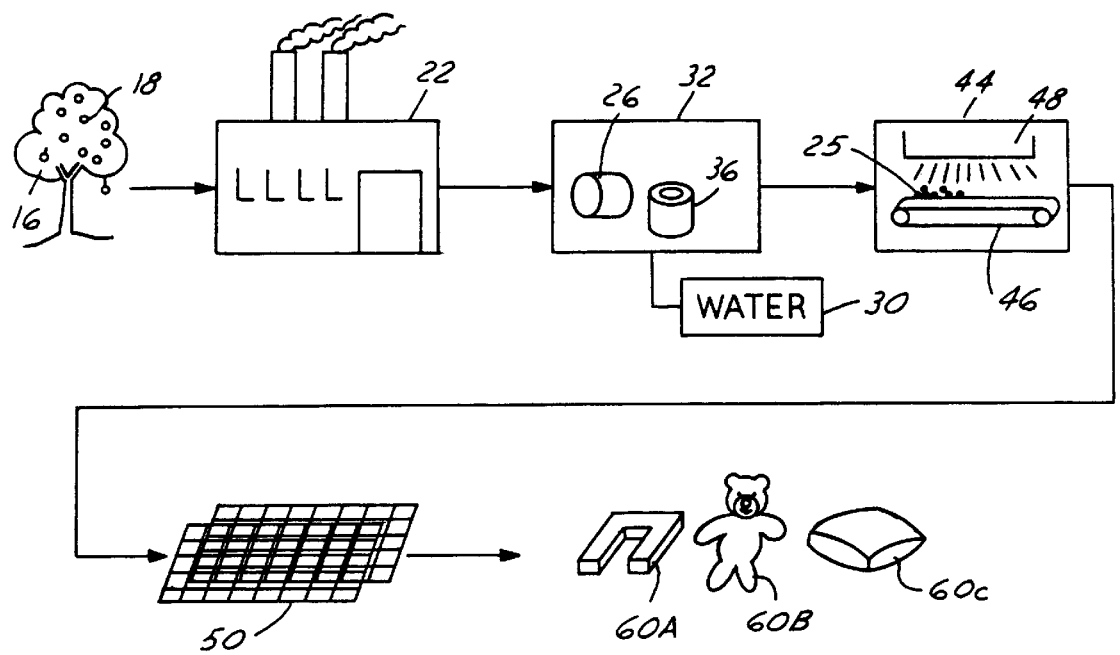
FIG. 2 is a schematic diagram of a cherry pit processing system.

FIGS. 1 and 2 generally depict a preferred process for processing the cherry pits. The flow chart which shows the principal steps is indicated by the reference numeral 10 in FIG. 1, while a schematic diagram of the various structures and facilities for the processing is referred to generally by the reference numeral 12 in FIG. 2.

As a first step, the cherries are harvested from the cherry trees. This is shown by Box No. 14 in FIG. 1, as well as the representative of a cherry tree 16 shown in FIG. 2. The cherries themselves are indicated by reference numeral 18 in FIG. 2.

Once the cherries are harvested, the pits are removed from them. This is shown by Box 20 in FIG. 1. The pits are typically re moved by a conventional pitting mechanism, such as a Dunkley pitter. The pitting process is done in a factory or facility 22. Typically, the pits are injected into a pit tube of the pitter and washed with water into a pit drain that flumes the pits with water from the plant to a pump. The washing of the pits at that time or immediately thereafter is shown by Box 24 in FIG. 1 and by the schematic diagram of a washing mechanism of conventional type 26 in FIG. 2. In this regard, at this time, excess water can be removed from the pits after they are washed. This is shown in the alternative by Box 28 in FIG. 1 and illustrated schematically by reference numeral 30 in FIG. 2. Also, the washing mechanism 26 is depicted in FIG. 2 in a plant or facility 32.

In order to remove the water from the pits, the pits can be pumped to a hydrosieve. The hydrosieve separates the pits from the water. The hydrosieve typically does not have any moving parts and works with gravity. As the water and pits flow over the sieve portion of the hydrosieve, the water flows through the opening while the pits pass over the top and are discharged into a separate tank.

As the next step in the process, any excess material or fruit from the cherries is removed from the pits. It is necessary to clean and remove this material so that it does not decay and cause an odor in the final products. This step is shown by Box 34 in FIG. 1. Also, a cleaning mechanism is shown generally by the apparatus depicted in FIG. 2 by the reference numeral 36. The cleaning mechanism can be any conventional abrading or scrubbing mechanism which removes particles from various products. Preferably, the mechanism is a Lansing camp Model B, which utilizes brushes and a wire mesh belt or screen. The pits are positioned onto a conveyor belt, such as a wire mesh conveyer belt, and delivered into the finishing mechanism. The brushes rotate against the screen and clean the pulp from the cherry pits as they pass through the device. The cleaning mechanism removes excess water from the cherry pits at the same time. The pits are discharged at the end of the cleaning mechanism 36 while the debris and water are discharged in a conventional manner.

The removal of excess water from the pits is depicted by Box 38 in FIG. 1. A blower can also be used for this purpose.

Preferably, no detergents or toxic materials of any type are utilized in the processing of the cherry pits. In this manner, no environmental harmful waste or byproducts are produced.

Once the pits are scrubbed and cleaned, they are transported or discharged to a drying and further finishing mechanism and/or facility. The travel or transportation of the pits to the drying mechanism is represented by Box 40 in FIG. 1. The drying of the pits in a drying mechanism is indicated by Box 42 in FIG. 1. A representative drying mechanism or facility is indicated by the reference numeral 44 in FIG. 2. In this regard, the cleaned cherry pits 25 are positioned on a moving conveyor belt, preferably of a wire mesh type 46, and passed through a dryer or drying mechanism 44 in which a heating mechanism 48 is positioned. The heating step and mechanism thoroughly dry the cherry pits. In this regard, the length of time that the pits are in the drying mechanism and the temperature of the drying mechanism are regulated in order to control the amount that the cherry pits are dried and the quality of the final product. In this regard, it is preferred that the pits be dried as much as possible in order to remove any residual moisture which would prevent future formation of mildew or condensation once the pits are positioned in a product.

For the drying step, the cherry pits could also be dried in an industrial microwave mechanism, or in a large grain dryer, both of which are conventional mechanisms currently in use for other purposes.

The drying mechanism should also preferably have a low humidity, preferably less than 15 percent humidity. It is desirable to remove as much liquid from the cherry pits as possible in order to reduce condensation and potential mildew problems in the final products.

The dried pits are then discharged into or transported from the drying facility or mechanism 44 onto a shaking/vibrating table 50 where the whole pits are separated from the broken and partial pieces. This is shown by Box 52 in FIG. 1. A conventional shaker table can be utilized to separate the whole pits from the partial and broken pits. Shaker mechanisms typically have tables with wire meshes or holes in them of various sizes in order to sift through and separate small pieces from larger ones. A gentle vibration of the table can separate the whole cherry pits from the partial and broken ones without damaging any of the whole pits.

The broken and partial pieces of cherry pits are discarded in a conventional manner. This is shown in Box 54. Thereafter, the pits are utilized in various products. This is shown in Box 56 of FIG. 1 and illustrated by products 60A, 60B, and 60C in FIG. 2.

Once the whole pits are separated, they are passed through a metal detector in order to remove any metal impurities which may have been included in the pits during the processing. An electromagnet can be used for this purpose. This is shown by Box 55 in FIG. 1.

Prior to being utilized directly in the various products, it is also possible for the cherry pits to be stored in large containers or batches until they are needed. In the product manufacturing facility, the cherry pits can be transported from a large central storage container or tank through hoses or the like and inserted in the mesh-type bags.

60A illustrates a generally U-shaped product which can be utilized around the arm, leg, or neck of a wearer. 60B depicts a representative stuffed-type animal in which the cherry pits can be utilized. 60C depicts a cushion in which the cherry pits can be utilized.

The products shown in FIG. 2, and further illustrated in FIGS. 3A–5B, are merely representative of all of the various products in which the cherry pits can be utilized. Thus, the present invention is not to be limited to the specific products shown. The description of the use of the products with reference to product 60A, 60B, 60C, is further described with reference to FIGS. 3A–5B.

In order to be utilized in products, the cherry pits are first inserted or included in a bag or container 62. Bag or container 62 is then inserted into an outer bag or other product, such as cushion bag 60C shown in FIG. 3B.

Figure 3A:
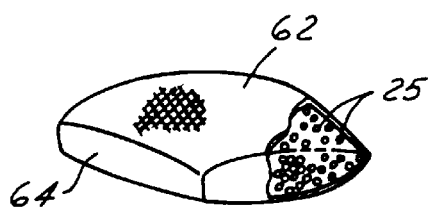
FIG. 3A depicts a bag or container filled with cherry pits.

The bag 62 shown in FIG. 3A is a bag preferably made of a mesh-type material 64. Also, the material is preferably a flame retardant polyester knit material. The cherry pits 25 are included in the bag and preferably the bag 62 is sewn or otherwise secured together holding the pits 25 inside of it. The mesh material allows the cherry pits 25 to "breathe" to a limited extent, and the flame-retardant material allows the bag to be heated in a microwave or oven in order to provide therapeutic usage of the cherry pits.

If the bags are made of a polyester knit material, they can be provided of a tubular knit. Once the tubular material is cut to length and inspected for flaws and/or runs, one end is permanently closed in any conventional manner. The cleaned and dried cherry pits are inserted into the open end of the bags and that end is then closed permanently capturing the cherry pits.

Figure 3B:
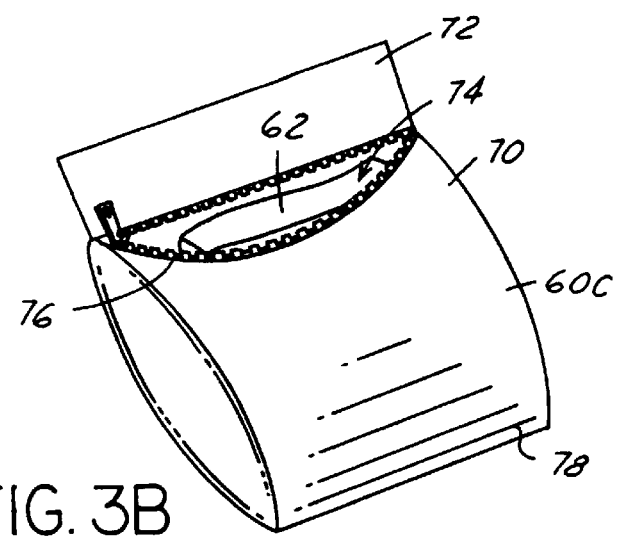
FIG. 3B illustrates an outer covering or cushion for use with the bag of cherry pits as shown in FIG. 3A.

The outer cushion or bag 60C, as shown in FIG. 3B, can be made from leather or any other material. For a cushion, the bag 60C can be square (as illustrated), round, or any other shape as desired.

As shown in FIG. 3B, the outer cushion product 60C has a body portion 70 and a flap member 72 attached thereto. An opening 74 is used for insertion of the bag 62 of cherry pits 25. The opening 74 also can be closed in any conventional manner, such as by a zipper 76. In this manner, once the bag 62 is inserted in the opening 74 in the cushion 60C, and the opening is closed, the flap 72 is pulled down to cover the opening.

Preferably, the material 78 forming the bag or cushion product 60C is also made from a flame-retardant material. The inside of the fabric can be laminated with a flame-retardant polyurethane coating. Preferably, the coating is also mildew and yeast resistant. The fabric forming the bag 60C should also be water resistant.

The material should meet the Consumer Products Safety Commission Juvenile Toy Standards for colorfastness, flame retardancy, toxicity, impact, torque, tension, compression and bite. One material which meets these standards is the polyester suede material from Fab Industries, Inc.

Figure 4A:
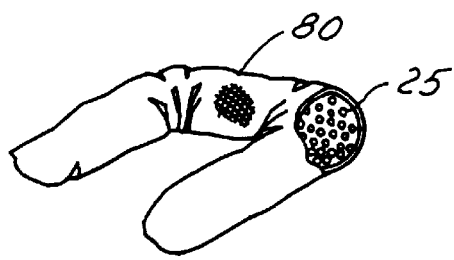
FIG. 4A is a generally U-shaped bag or container filled with cherry pits.
Figure 4B:
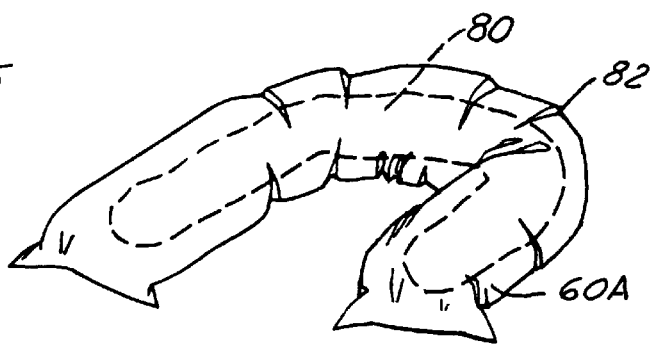
FIG. 4B illustrates a generally U-shaped outer bag or product in which the bag of cherry pits shown in FIG. 4A is utilized.

Another product in which the cleaned and processed cherry pits can be used is a U-shaped product G0A shown in FIG. 4B. For this product, a generally U-shaped inner bag member 80 is utilized. The bag 80 is made from a mesh, flame-retardant fabric and holds a appropriate supply of cherry pits 25. The inner bag 80 is then inserted into the outer bag or product 60A, preferably through a zippered opening along one side or edge 82 (not shown).

Figure 5A:
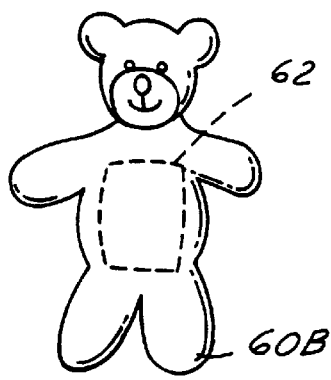
FIG. 5A illustrates a representative "stuffed" animal character in which a bag or container of cherry pits is utilized.
Figure 5B:
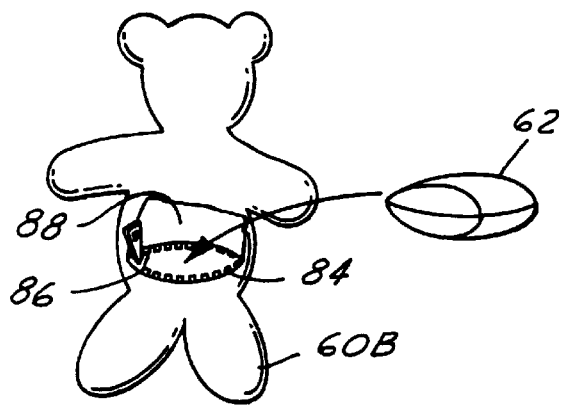
FIG. 5B is a rear view of the animal character shown in FIG. 5A.

Another use of the present invention is shown in FIGS. 5A and 5B. The bag 62 of cherry pits 25 can be used in a stuffed animal, such as the stuffed bear 60B. Of course, it is understood that any type of animal character can be used for this purpose.

In order to allow insertion and removal of the bag or container 62 from the stuffed animal character 60B, an opening 84 is provided. The opening 84 can be sewn closed or closed in any other conventional manner. For example, a zipper 86 can be provided, as well as a flap member 88 used to cover the zipper once it is zipped up with the bag 62 positioned inside the animal or character 60B.

For therapeutic use of the product, it can be heated or cooled as desired. For example, the products with the cherry bag inside, such as products 60A, 60B, and 60C described above, can be inserted into an oven or microwave for a period of time in order to heat the cherry pits to an appropriate warm temperature. Thereafter, the warmth from the cherry pits and the products can then be used therapeutically to soothe stiff muscles, tired or weary limbs, or remove stresses caused by the user's daily routine. The pit-filled cushion or product provides prolonged warmth and soothing comfort. The penetrating warmth soothes body aches and calms senses. For children, the warmth can provide soothing comfort while they are resting. The product also is port able and versatile.

For a microwave oven, the heating time will vary depending on the particular microwave used. However, the product with the cherry pits in it should be placed on a non-metal plate for approximately 30–45 seconds on a "high" setting (700 watts). In a traditional oven, the cherry pit product should be placed in a heat resistant dish. The product should be put in pre-heated oven at approximately 250–260° F. (130° C.) for approximately three minutes. The warm-up time can be lengthened if necessary and as desired.

The present invention can also be utilized as a cooled therapeutic product. In this regard, the bags of cherry pits, or the products themselves, can be positioned in a refrigerator or freezer for an appropriate length of time in order to achieve a cold or chilled state. Thereafter, the product can be applied to a pulled or aching muscle or other spot as desired in order to provide a therapeutic benefit to it.

In a freezer, the product with the cherry pits in it can be inserted directly into the freezer for approximately three to four hours or until sufficiently chilled. Thereafter, it can be used the same as any traditional ice pack.

With the present invention, the soothing heat or comforting coolness will be retained for one hour or more in the cherry pits. This allows lengthy use of the product for its therapeutic benefit.

As a result, the cushion with the cherry pits inside of it can be used to apply hot or cold compresses to small children and babies in order to relieve pain or just to provide comfort. Since the application of warm or cold compresses to small children and babies is often difficult, and particularly difficult to keep in position, the shape and material for the products 60A, 60G and 60C are provided so that the children will want to "cuddle" them and thus put it on the location where it is needed and keep it there for its purpose.

Finally, since the cherry pits are biodegradable, the products can be easily disposed of when no longer needed or utilized.

While particular embodiments of the invention have been shown and described, numerous variations and alternate embodiments will occur to those skilled in the art. Accordingly, it is intended that the invention be limited only in terms of the appended claims.

What is claimed is:

1. A process for cleaning and drying cherry pits comprising the steps of:

washing the cherry pits after they have been removed from the cherries;

scrubbing the cherry pits to remove remaining cherry pulp;

removing excess water from the cherry pits;

drying the cherry pits at an elevated temperature;

separating whole cherry pits from broken and partial pits; and transporting the whole cherry pits for further usage.

2. The process as recited in claim 1 further comprising removing any metal impurities from the cherry pits.

3. The process as recited in claim 1 wherein the drying step comprises passing the cherry pits through a drying oven.

4. The process as recited in claim 1 wherein the scrubbing step comprises brushing the cherry pits with brushes.

5. The process as recited in claim 1 wherein the step of removing excess water from the cherry pits comprises passing the cherry pits through a hydrosieve.

6. The process as recited in claim 1 further comprising transporting the cherry pits between at least two of the steps by a conveying mechanism.

7. The process as recited in claim 1 wherein the separating step comprises placing the cherry pits on a shaking/vibrating mechanism to separate whole cherry pits from broken and partial cherry pits.

* * * * *